W. H. & J. S. LAKIN.
Fertilizer.
No. 52,295. Patented Jan. 30. 1866.
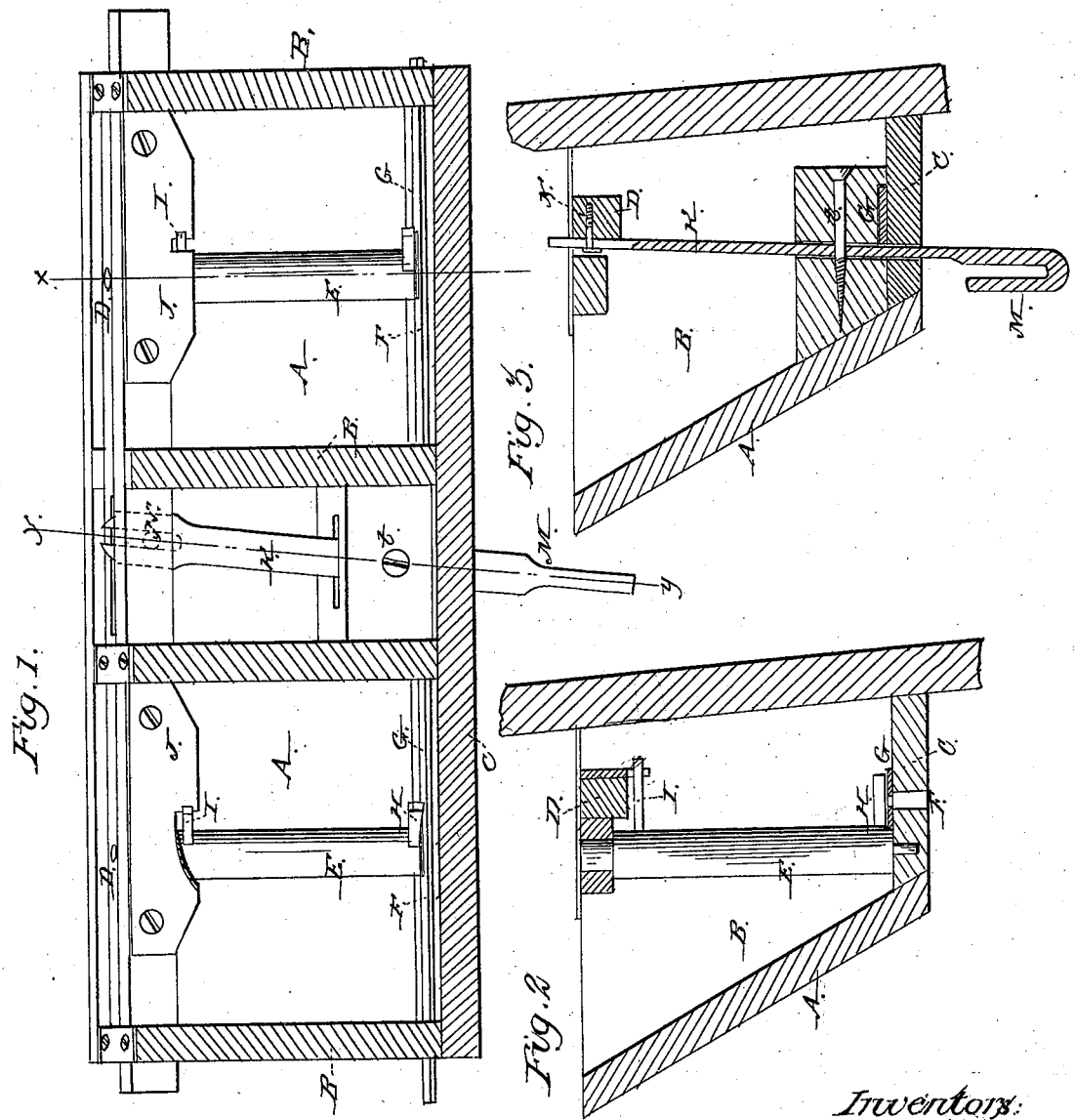

UNITED STATES PATENT OFFICE.

WILLIAM H. LAKIN AND JOHN S. LAKIN, OF LANDER, MARYLAND.

IMPROVEMENT IN FERTILIZER-SOWERS.

Specification forming part of Letters Patent No. 52,295, dated January 30, 1866.

*To all whom it may concern:*

Be it known that we, WILLIAM H. LAKIN and JOHN S. LAKIN, of Lander, in the county of Frederick and State of Maryland, have made new and useful Improvements in Fertilizer-Sowers; and we do hereby declare the following to be a full, clear, and exact description of the nature, construction, and operation of the same, sufficient to enable one skilled in the art to which it appertains to construct and use the same, reference being had to the accompanying drawings, which is made part of this specification, and in which—

Figure 1 is an elevation of the appliance detached from the ordinary seed-box of the drill. Fig. 2 is a section on the line $x\,x$, Fig. 1. Fig. 3 is a section on the line $y\,y$, Fig. 1.

Our invention consists of a box for sowing fertilizers in connection with grain, and to be attached to the ordinary grain-box or hopper of a drill; and the peculiar feature of improvement consists in the reciprocating post and pin, the latter moving over and acting in connection with the adjustable orifice in the bottom plate of the hopper, to keep the discharge open for the passage of the fertilizing-powder.

A is the side of the hopper of the usual feed-box of the drill; B is the side, and C the bottom, of the box containing the fertilizer. The other side is open, being against the side of the grain-box A.

Pivoted in the bottom C of the box and in the bar D are posts E, two of which are shown in the drawings, one being stationed at each hole F, through which the fertilizing-powder passes. These orifices are wider in the bottom C than in the plate G, so that whatever passes through the hole in the plate may pass freely, and the plate G is adjustable lengthwise, so as, in connection with the orifice in the bottom C, to regulate the size of the opening. Each of the posts E has upon it two pins, the lower one, H, being in immediate proximity to the plate G and above the orifice in the latter, and the upper pin, I, being so placed as to be impinged upon by the plate J, which receives a reciprocating longitudinal motion from the bar K, which is pivoted at $t$, and is moved by the proper attachment of the hook M to the moving bar of the drill. A slot in the upper end of the bar K is occupied by the pin N in the bar D, and the latter is provided with the plates J, whose notches engage the pins I and communicate a reciprocating rotary motion to the posts E.

The attachment above described is made the length of the feed-box of the drill, whatever that may be, and the openings are at such distances and of such sizes as may be required to properly distribute the fertilizer upon the ground.

The object and effect of the reciprocating pins H is to keep the holes open so that the fertilizer may feed through uninterruptedly. This is effected in a much more thorough manner by this reciprocating movement than by a rotary, because in the former case the pin, describing an arc of, say, sixty degrees, keeps a mass of loose powder above the hole, which readily finds its way through, and after awhile a funnel-shaped opening in the mass is formed, the sides of which crumble down to supply the opening.

In the ordinary form of the machine, when the post revolves the pin frequently becomes gummed up with the fertilizer, and moves in a circular opening which it has formed, packing the powder around it so as to prevent it from reaching the hole. This irregular feed is what we have avoided by the means detailed—namely, the reciprocating pin over the discharge-orifice in the bottom of the box.

The plate is an incidental appendage to afford means for regulating the size of the openings.

We do not claim a post with pins attached which rotate in a horizontal plane, as that is shown in Barkle's patent of April 22, 1856; nor do we claim a horizontal rocking shaft provided with pins which oscillate above the apertures. as that is seen in the patent of Crowell, June 23, 1863; but

What we claim as new, and desire to secure by Letters Patent, is—

The reciprocating vertical post E, with pin H, which vibrates in a horizontal plane above the aperture, substantially as described and represented.

To the above specification of our improvement in fertilizer-sowers we have set our names this 29th day of August, 1865.

WM. H. LAKIN.
JOHN S. LAKIN.

Witnesses:
JOHN J. BISEN,
F. A. HOFFMAN.